(12) United States Patent
Ulitzka et al.

(10) Patent No.: US 12,350,752 B2
(45) Date of Patent: Jul. 8, 2025

(54) METHOD OF MAKING A TOOL COMPRISING CARBIDE AND STEEL BY BRAZING

(71) Applicant: AB SANDVIK COROMANT, Sandviken (SE)

(72) Inventors: Tim Ulitzka, Dortmund (DE); Wolfgang Tillmann, Dortmund (DE); Leif Dahl, Stockholm (SE)

(73) Assignee: AB Sandvik Coromant, Sandviken (SE)

( * ) Notice: Subject to any disclaimer, the term of this patent is extended or adjusted under 35 U.S.C. 154(b) by 70 days.

(21) Appl. No.: 18/267,887

(22) PCT Filed: Dec. 15, 2021

(86) PCT No.: PCT/EP2021/085834
§ 371 (c)(1),
(2) Date: Jun. 16, 2023

(87) PCT Pub. No.: WO2022/129133
PCT Pub. Date: Jun. 23, 2022

(65) Prior Publication Data
US 2024/0001470 A1    Jan. 4, 2024

(30) Foreign Application Priority Data
Dec. 17, 2020   (EP) .................................. 20214970

(51) Int. Cl.
*B23K 1/008*   (2006.01)
*B23K 1/00*    (2006.01)
(Continued)

(52) U.S. Cl.
CPC ............ *B23K 1/008* (2013.01); *B23K 1/0008* (2013.01); *B23K 35/004* (2013.01); *B23K 35/0233* (2013.01); *B23K 35/3006* (2013.01); *C22C 5/08* (2013.01); *C22C 29/10* (2013.01); *B23K 2101/20* (2018.08)

(58) Field of Classification Search
None
See application file for complete search history.

(56) References Cited

U.S. PATENT DOCUMENTS

| | | | |
|---|---|---|---|
| 10,814,435 B2 * | 10/2020 | Grunder | ................ B23K 35/30 |
| 2017/0304959 A1 | 10/2017 | Chen et al. | |
| 2018/0169796 A1 * | 6/2018 | Clark | .................... B23K 35/325 |

FOREIGN PATENT DOCUMENTS

| | | | |
|---|---|---|---|
| CN | 110091023 A * | 8/2019 | .......... B23K 1/0008 |
| EP | 2644307 A1 | 10/2013 | |

(Continued)

OTHER PUBLICATIONS

SSA Maraging Steel Data sheet, commericial publication (Year: 2018).*

*Primary Examiner* — Devang R Patel
(74) *Attorney, Agent, or Firm* — Corinne R. Gorski

(57) ABSTRACT

A tool includes a cemented carbide part and a maraging steel part, wherein the two parts are joined by brazing. The cemented carbide part has a hard phase embedded in a metallic binder phase matrix. The maraging steel part has a hardness of between 350 and 600 HV1 with a standard deviation between 0 and 20 HV1. A method of making such tool is also provided.

13 Claims, 6 Drawing Sheets

(51) Int. Cl.
*B23K 35/00* (2006.01)
*B23K 35/02* (2006.01)
*B23K 35/30* (2006.01)
*C22C 5/08* (2006.01)
*C22C 29/10* (2006.01)
*B23K 101/20* (2006.01)

(56) References Cited

FOREIGN PATENT DOCUMENTS

| | | | |
|---|---|---|---|
| JP | H10140856 A | | 5/1998 |
| JP | 2004314218 A | * | 11/2004 |
| JP | 2013253277 A | * | 12/2013 |

* cited by examiner

METHOD OF MAKING A TOOL COMPRISING CARBIDE AND STEEL BY BRAZING

RELATED APPLICATION DATA

This application is a § 371 National Stage Application of PCT International Application No. PCT/EP2021/085834 filed Dec. 15, 2021 with priority to EP 20214970.4 filed Dec. 17, 2020.

TECHNICAL FIELD

The present invention relates to a tool comprising a cemented carbide part and a maraging steel part wherein the parts are joined by brazing. The present invention also relates to the making of such tool.

BACKGROUND

Joining steel with cemented carbide by brazing or welding has been known for a long time in the art of making tools. There are several challenges when joining steel with cemented carbide, e.g. differences in CTE (coefficient of thermal expansion), strength of the braze joint, undesired hardness profiles in the steel etc.

There are several solutions that can improve each of these problems individually, but the solutions often result in problems in other areas and not all problems can be solved.

The principle of brazing is that you use a braze material that joins the two pieces when heated. There are several ways to heat the braze joint, where one of the most common ways is induction heating using an induction coil. One of the benefits with using a coil is that only the local area around the braze joint is heated and leaving the rest of the tool unaffected. This local heating can however lead to unwanted hardness profiles in the steel part which can cause problems when the steel part will be provided with threading etc. for fastening rotary tools and other cutting tools etc.

Another disadvantage with the heating using a coil, is that each tool must be handled individually, and a more automatic industrial process would be preferred.

Heating the whole steel and cemented carbide part would make the hardness profile more even but then the increased temperature would affect the whole steel part and thus lead to less hardness overall.

Another problem that can occur when the steel part is provided with threading in order to fasten a cutting tool, is wear. Since the same tool e.g. a shank, is preferably used for a long time, many changes of cutting tool will take place and wear of the threading can affect the fastening of the cutting tool in a negative way.

SUMMARY

One object of the present invention is to provide a tool which have both a strong braze joint and a steel part with an even hardness profile and a high hardness and consequently an improved wear resistance.

Another object of the present invention is to provide a process of joining steel and cemented carbide which is easy to use and leads to a predictable joint with high strength and a steel part that has a predictable hardness.

DETAILED DESCRIPTION OF THE PRESENT INVENTION

Figure 1:
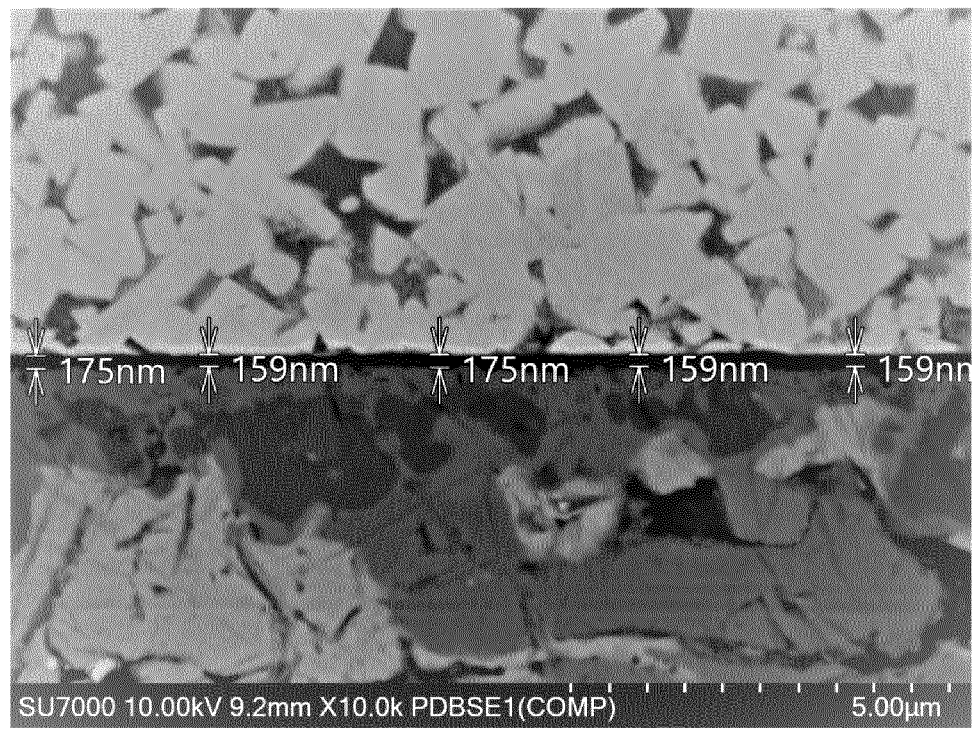
FIG. 1 is a SEM image of the interface between the cemented carbide part and the braze material of invention 9 at a magnification of 10000.

The invention relates to a tool comprising a cemented carbide part and a maraging steel part with a hardness of between 350 and 600 HV1 with a standard deviation between 0 and 20 HV1. The tool further comprises a braze joint joining said cemented carbide part and said steel part where said braze joint comprises Ti and wherein said braze joint comprises a TiC layer with a thickness of between 0.03 and 5 μm adjoining to the cemented carbide part.

The cemented carbide part can be made of any cemented carbide common in the art. The cemented carbide comprises a hard phase embedded in a metallic binder phase matrix.

By cemented carbide is herein meant that at least 50 wt % of the hard phase is WC.

Suitably, the amount of metallic binder phase is between 3 and 20 wt %, preferably between 4 and 15 wt % of the cemented carbide. Preferably, the main component of the metallic binder phase is selected from one or more of Co, Ni and Fe, more preferably the main component of the metallic binder phase is Co.

By main component is herein meant that no other elements are added to form the binder phase, however, if other components are added, like e.g. Cr, it will inevitably be dissolved in the binder during sintering.

In one embodiment of the present invention, the cemented carbide can also comprise other components common in cemented carbides elements selected from Cr, Ta, Ti, Nb and V present as elements or as carbides, nitrides or carbonitrides.

The steel part is made of maraging steel. Maraging steel is a type of steel which is hardened by precipitation of intermetallic compounds. Maraging steels suitably contains from 13 to 25 wt % Ni and one or more alloying elements selected from Co, Mo, Ti, Al and Cr in a total amount of between 10 to 27 wt %, preferably between 11 to 23 wt % of alloying elements. Maraging steels typically contains less carbon than conventional steel, suitably 0.03 wt % or less. The balance being Fe and unavoidable impurities.

The maraging steel according to the present invention preferably contains from 13 to 25 wt % Ni, preferably 17 to 25 wt % Ni. The alloying elements are suitably Co in an amount of from 7 to 15 wt %, preferably 8.5 to 12.5 wt % Co, Mo in an amount of from 3 to 10 wt %, preferably 3 to 6 wt % Mo, Ti in an amount of from 0.1 to 1.6 wt % preferably from 0.5 to 1.2 wt % Ti, from 0.05 to 0.15 wt % Cr, Al in an amount of from 0 to 0.2 wt % and less than 0.03 wt % C. The balance is Fe and unavoidable impurities.

In one embodiment of the present invention, the maraging steel have a composition of from 17 to 19 wt % Ni, from 8.5 to 12.5 wt % Co, from 4 to 6 wt % Mo, from to 1.2 wt % Ti, from 0.05 to 0.15 wt % Cr, from 0 to 0.2 wt % Al, less than 0.03 wt % C and balance Fe and unavoidable impurities.

The average hardness of the maraging steel part is suitably between 350 and 600 HV1, preferably between 400 and 460 HV1 and more preferably 410 to 450 HV1. The hardness is measured by a Vickers hardness tester, applying a load of 1 kgf (kilogram force) and a loading time of 15 s. A pattern of 3×6 indents in the full material (not surface) of the maraging steel parts was applied. The average value is an average of these measurement points. The standard deviation of the hardness values is suitably between 0 to 20 HV1, preferably between 0 and 14 HV1.

The brazing technique is the so-called active brazing. By that is meant that the joint is not just formed by melting the braze material and forming a metallic bond, it also involves a chemical reaction with one or both of the materials that are to be joined. The reactive element in the braze material is usually Ti, however elements such as Hf, V, Zr and Cr are also considered to be active elements. According to this invention, Ti is the active element.

By braze joint is herein meant the area or mass between the cemented carbide part and the maraging steel part that is filled by the braze material and formed during the brazing process, see below.

The thickness of the braze joint is suitably between 20 and 200 Linn, preferably between 30 and 100 Linn.

The braze joint is not a homogenous phase. Instead, after brazing, the elements in the braze material form different phases.

The braze joint suitably contains Ti. During brazing Ti will react with the carbon in the cemented carbide part and form a TiC layer at the interface between the braze joint and the cemented carbide part.

There are several ways to detect the presence of a TiC layer depending on which type of equipment that is used.

If a Scanning Electron Microscope (SEM) with a high enough resolution is used, the TiC layer is clearly visible adjacent the cemented carbide part. See e.g. FIGS. 1 and 2.

If the SEM used does not have enough resolution to show the TiC layer, the accumulation of Ti and/or C at the interface between the braze material and the cemented carbide can be seen using e.g. SEM-EDS or SEM-EPMA with WDS. The accumulation of Ti is herein after called the Ti-accumulation layer and is a good indicator that a TiC layer is formed, even if not visually detected in the SEM image. The Ti-accumulation layer is considerably thicker than the actual TiC-layer which could mean that not all Ti will form TiC. The thickness of the Ti-accumulation layer is also partly affected by the analyze method.

In one embodiment of the present invention, the thickness of the TiC layer is between 0.03 and 5 µm, more preferably between 0.05 and 0.5 Linn and most preferred between 0.05 and 0.25 Linn.

Preferably, the braze joint further comprises one or more elements selected from Ag, Cu, Sn, In, Zr, Hf, Cr. More preferably from Ag, Cu and Sn.

The composition of the braze joint after brazing is difficult to determine since the elements are not evenly distributed. If available, the easiest way is to look at the braze material that has been used since the paste or foil are a homogenous blend. Also, the braze joint might comprise small amounts of elements from the materials to be joined, e.g. Co, W from the cemented carbide and Fe, Ni etc. from the maraging steel.

The amount of Ti and the other elements in the braze joint could also be measured using Energy-dispersive X-ray spectroscopy analysis (EDS). However, due to the uneven distribution of the elements in the braze joint, many measuring points need to be used and the standard variation will be large. Preferably, the braze joint comprises, in average, Ag in an amount of from 30 to 80 wt %, preferably from 40 to 75 wt %, Cu in an amount of from 15 to 65 wt %, preferably from 20 to 40 wt %, Ti in an amount of from 0.3 to 15 wt %, preferably from 0.5 to 5 wt % and Sn in an amount of from 0 to 10 wt %, preferably from 0 to 2 wt %.

The braze joint suitably has a shear strength of at least 130 MPa, preferably at least 140 MPa more preferably between 140 and 300 MPa. The shear strength is measured by shear testing.

At the interface between the braze joint and the maraging steel part Ti is also accumulated in the braze joint where it forms a metallic bond with the iron in the steel. The thickness of the accumulation layer of Ti at the maraging steel surface is preferably between 1 and 10 Linn, preferably between 2 to 5 µm and can be measured by e.g. EDS.

In one embodiment of the present invention, the maraging steel part is, at least onto the surface towards the braze joint, provided with a Ni layer with an average thickness of between 2 and 10 Linn, preferably between 4 and 6 µm.

The Ni layer can be provided either as a foil or be deposited by any suitable deposition method like e.g. physical vapor deposition.

In one embodiment of the present invention, no Ni layer is provided on the maraging steel part.

In one embodiment of the present invention the maraging steel has a composition of from 17 to 19 wt % Ni, from 8.5 to 12.5 wt % Co, from 4 to 6 wt % Mo, from 0.5 to 1.2 wt % Ti, from 0.05 to 0.15 wt % Cr, from 0 to 0.2 wt % Al, less than 0.03 wt % C and balance Fe and unavoidable impurities, preferably the maraging steel grade 1.2709 is used. The cemented carbide has a composition of 4 to 15 wt % Co, 0.1 to 1 wt % Cr and the rest WC. The braze joint have an average composition of 55 to 75 wt % Ag, 20 to 36 wt % Cu, 1 to 3 wt % Ti and 2 to 8 wt % Sn.

The tool can be any tool or part of a tool common in the art where a cemented carbide part is joined with a steel part by brazing. Examples are drills, end mills, tool holders like shanks etc.

In one embodiment of the present invention, the tool is a shank used as a tool holder for a cutting tool like an insert, drill head etc. The shank is formed by a cemented carbide part and a steel part, where the cemented carbide part is used to create stability and the steel part is necessary to create threading to fasten a cutting tool.

The present invention also relates to a method of making a tool according to the above comprising the steps of:

providing a cemented carbide part and a maraging steel part;

placing a braze material comprising Ti in an amount from 0.3 to 15 wt % of the braze material between and in contact with the cemented carbide part and the maraging steel part.

subjecting the cemented carbide part and the maraging steel part with the braze material in between to a brazing step in a furnace at a temperature between 700 and 1200'C, for a time period of between 5 and 60 minutes and wherein the brazing takes place in vacuum;

subjecting at least the maraging steel part to an ageing step at a temperature of between 300 and 700'C for between 5 minutes and 12 hours.

The cemented carbide part and the maraging steel part have a composition as described above. The hardness of the maraging part, prior to brazing, can differ from that described above depending on maraging steel grade and if the steel has been aged or not.

The shape and size of the cemented carbide part and the maraging steel part are depending on the type of tool that is to be made.

The braze material (also called filler metal or solder) according to the present invention contains Ti in a total amount of from 0.3 to 15 wt %, preferably 1 to 5 wt % of the braze material. The braze material of the present invention suitably have a solidus temperature of between 488 and 1123° C., preferably between 650 and 780° C. Further, the braze material of the present invention has a liquidus temperature of between 612 and 1180° C., preferably between 750 and 850° C. The braze material further comprises, in addition to Ti, one or more elements selected from Ag, Cu, Sn, In, Zr, Hf and Cr.

In one embodiment of the present invention, the braze material comprises Ag in an amount of from 30 to 80 wt %, preferably from 40 to 75 wt %, Cu in an amount of 15 to 65 wt %, preferably from 20 to 40 wt %, Ti in an amount of 0.3 to 15 wt %, preferably from 0.5 to wt % and Sn in an amount of 0 to 10 wt %, preferably from 0 to 2 wt %.

Suitably, the braze material is provided as a foil or paste.

The braze material is provided onto the joining surfaces of the cemented carbide part and the steel part.

The thickness of the braze material prior to the brazing process are suitably between 25 and 200 Linn, preferably between 50 and 100 Linn.

The parts are then placed in a furnace with an inert environment, i.e. with minimum amount of oxygen. Preferably, the brazing temperature in the furnace is between 750 and 1200'C, preferably between 800 and 950'C more preferably between 800 and 830'C. The time the parts are subjected to the elevated temperature is between 5 and 60 minutes, preferably between 5 and 15 minutes. If the time at elevated temperature is shorter, there is not enough time for the braze joint to form and the Ti to react to reach the desired strength of braze joint. If the time at elevated temperature is longer, the Ti-containing, brittle reaction zone will grow uncontrolled, which negatively influences the joint properties, e.g. shear strength.

The brazing suitably takes place in vacuum or with the presence of Argon at low partial pressure. By vacuum is herein meant that the pressure in the furnace is below $5\times10^{-4}$ mbar, preferably below $5\times10^{-5}$ mbar. If argon is present, the argon pressure is below $1\times10^{-2}$ mbar.

During the brazing in the furnace, a clamping force might be applied to further enhance the brazing. By clamping force is herein meant that the steel part and the cemented carbide part is pressed against each other so that a force is applied, preferably by placing external weights in the carbide part. The force that will act on the braze joint by the weight of the cemented carbide part or maraging steel part, depending on which part that is on top of the other, is not included in these values.

In one embodiment, a clamping force between 0.5 and 10 MPa, preferably between 2 and 8 MPa is applied.

In one embodiment of the present invention, no clamping force is applied.

After brazing, the parts are subjected to an ageing step by subjecting the parts to an elevated ageing temperature of between 300 and 700° C., preferably between 500 and 600° C. and most preferably between 550 and 600° C., for a time of between 5 minutes and 12 hours, preferably between 3 and 6 hours.

Suitably the heating rate is up to the ageing temperature is between 1 to 50° C./min, preferably is between 5 to 10° C./min. Suitably the cooling rate from the ageing temperature down to a temperature at least below the solidus temperature of the braze material is between 1 to 50° C./min, preferably is between 5 to 10° C./min.

The brazing furnace used according the present invention can be any furnace that can provide such well controlled conditions with regard to a vacuum, heating and cooling rate etc. as has been described above. The brazing and ageing steps can either be done in the same furnace or in two separate furnaces.

It is common that the steel part will be subjected to a machining operation like e.g. threading etc. To be able to machine the steel part, the hardness cannot be too high, and depending on what type of maraging steel grade that is chosen, the ageing step can be done either before or after the machining of the steel part, in order to achieve the desired hardness and wear resistance in the final tool.

In one embodiment of the present invention, the ageing takes place directly after the brazing step and any machining of the steel like e.g. threading, is performed onto the already aged maraging steel, i.e. after the ageing step.

In another embodiment of the present invention, the ageing takes place after any machining of the steel like e.g. threading etc.

Example 1 (Invention)

A steel part made of maraging steel 1.2709 was provided together with a cemented carbide part with a composition of 10 wt % Co, 1 wt % other carbides and the remaining WC.

The braze material was provided in the form of a foil with a thickness of 100 Linn. The braze material had a composition of 65.0 wt % Ag, 28.0 wt % Cu, 2.0 wt % Ti, and 5.0 wt % Sn. The solidus temperature is ca. 700° C., the liquidus temperature is ca. 750° C.

The foil was placed between the maraging steel part and the cemented carbide part so that both pieces were in contact with the foil. The assembled joining pieces were then placed into a Schmetz vacuum furnace (type: EU 80/1H 30×45×30 6 bar System *2RV*) where the temperature was first increased to 815° C. at a rate of 20° C./min. The brazing temperature 815° C. was kept for a time, $t_{brazing}$, after which the pieces were cooled down to 300° C. at a rate of 5° C./min. After 300° C. it was free cooling.

For some of the samples, the surface of the maraging steel part facing the braze material, was coated with a Ni-layer with an average thickness of 4.7 Linn with a standard deviation of 0.2 Linn. The Ni-layer was applied by Arc Physical Vapor Deposition.

TABLE 1

|  | $t_{brazing}$ (min) | Clamping force (MPa) | Ni-coating |
|---|---|---|---|
| Invention 1 | 15 | 0 | Yes |
| Invention 2 | 15 | 0 | No |

TABLE 1-continued

|  | $t_{brazing}$ (min) | Clamping force (MPa) | Ni-coating |
|---|---|---|---|
| Invention 3 | 5 | 0 | Yes |
| Invention 4 | 5 | 0 | No |
| Invention 5 | 15 | 6 | Yes |
| Invention 6 | 15 | 6 | No |
| Invention 7 | 10 | 0 | No |
| Invention 8 | 10 | 0 | Yes |

After the brazing step, the brazed pieces were subjected to an ageing process to retain the hardness of the maraging steel. The pieces were placed into a furnace where the temperature was first increased to 580° C. at a rate of 5° C./min. The temperature 580° C. was kept for 3 h after which the pieces were cooled down to 300° C. at a rate of 5° C./min. After 300° C. it was free cooling.

Example 2 (Invention)

A tool shank was manufactured by joining a steel part made of maraging steel 1.2709 and a cemented carbide part with a composition of 10 wt % Co, 1 wt % other carbides and the remaining WC.

The braze material was provided in the form of a foil with a thickness of 100 Linn. The braze metal had a composition of 65.0 wt % Ag, 28.0 wt % Cu, 2.0 wt % Ti, and 5.0 wt % Sn. The solidus temperature is ca. 700° C., the liquidus temperature is ca. 750° C.

The foil was placed between the maraging steel part and the cemented carbide part and assembled joining pieces were placed into a Schmetz vacuum furnace (type: EU 80/1H 30×45×30 6 bar System *2RV*) where the temperature was first increased to 815° C. at a rate of 20° C./min. The brazing temperature 815° C. was kept for a time $t_{brazing}$=15 min, after which the pieces were cooled down to 300° C. at a rate of 5° C./min. After 300° C. it was free cooling.

The tool made according to this example will herein after be called Invention 9.

Example 3 (Comparative)

A steel part made of steel 1.6582 (34CrNiMo6) was provided together with a cemented carbide part with a composition of 10 wt % Co and 0.4 wt % Cr and the remaining WC.

The braze material was Ag49Zn23Cu16Mn7.5Ni4.5 in the form of a wire which was applied as a ring with a diameter of 1-2 mm.

Figure 5:
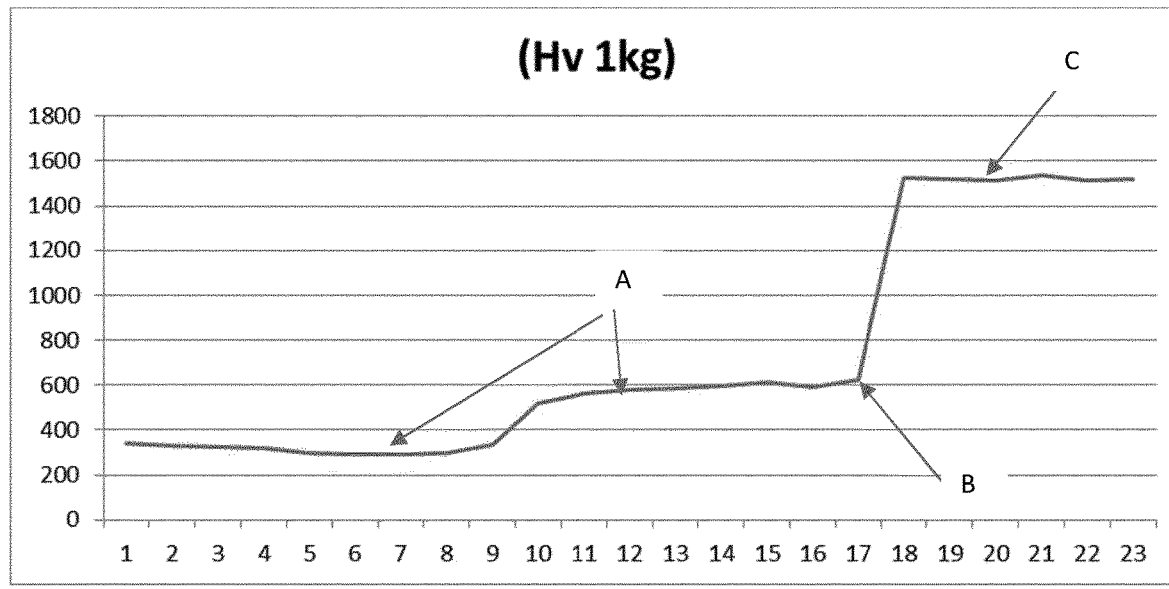
FIG. 5 shows the hardness profile of a tool where induction heating has been used. A is the steel part, B is the braze joint and C is the cemented carbide.

The pieces were joined by induction heating using a coil by rapidly heating the braze joint to 700° C. and hold for 15 s, after which the powder is turned off and the tool is allowed to cool to room temperature. In FIG. 5 the hardness values of the steel part are shown where the measuring points is placed along a line from a distance from the braze joint in the steel part and over the braze joint to the cemented carbide part.

The sample are herein denoted Comparative 1.

Example 4 (Comparative)

A steel part made of the carbon-hardening hot-work steel 1.2344 was provided together with a cemented carbide part with a composition of 10 wt % Co, 1 wt % other carbides and the remaining WC. The hot-work steel component was in a pre-hardened condition. The steel was quenched from 1060'C with $N_2$ in a vacuum furnace and subsequently relaxed three times at 200° C. for 10 minutes. The mean hardness value of the quenched 1.2344 part was 582 HV1 with a standard deviation of 66 HV1.

The braze material 1 was provided in the form of a foil with a thickness of 100 Linn. Braze material 2 was provided in the form of a paste. The braze material 1 had a composition of 60.0 wt % Ag, 24.0 wt % Cu, 14.0 wt % In, and 2.0 wt % Ti. The solidus temperature is ca. 620° C., the liquidus temperature is ca. 720° C. The brazing material 2 had a composition of 59.0 wt % Ag, 27.25 wt % Cu, 12.5 wt % In, and 1.25 wt % Ti. The solidus temperature is ca. 605° C., the liquidus temperature is ca. 715° C.

The braze material was placed between the maraging steel part and the cemented carbide part so that both pieces were in contact with the braze material. The assembled joining pieces were placed into the furnace where the temperature was first increased to 500° C. at a rate of 20° C./min and hold for 5 minutes. From 500° C. the temperature was then increase by a rate of 50° C./min to the brazing temperature T Brazing, which differed between 685° C. (braze material 1) and 715° C. (braze material 2). T Brazing was kept for a dwell time of 4 min, after which the pieces were cooled down to room temperature by free cooling.

The hardness was measured and the results are shown in Table 2.

The two samples 685'C (braze material 1) and 715° C. (braze material 2) are herein denoted Comparative 2 and 3, respectively.

Shear strength values were not determined.

Example 5 (Comparative)

A steel part made of the carbon-hardening hot-work steel 1.2344 was provided together with a cemented carbide part with a composition of 10 wt % Co, 1 wt % other carbides and the remaining WC.

The braze material was provided in the form of a foil with a thickness of 100 Linn. The braze metal had a composition of 100.0 wt % Cu. The melting temperature is 1085° C.

The foil was placed between the maraging steel part and the cemented carbide part and assembled joining pieces were placed into the furnace where the temperature was first increased to 650° C. at a rate of 20° C./min and hold for 5 minutes. From 650° C. the temperature was then increase by a rate of 10 K/min to the brazing temperature $T_{Brazing}$, which was 1100° C. T Brazing was kept for a dwell time of 15 min, after which the pieces were cooled down to 850° C. with a cooling rate of 50 K/min. From 850° C., the specimens were $N_2$-quenched with an overpressure of 2 Bar and a fan frequency of 2500 $min^{-1}$.

Subsequently, the cemented carbide-steel joint with the carbon-hardening hot-work steel 1.2344 was aged at 630° C. for 2 h two times.

The sample will herein be denoted Comparative 4.

Example 6 (Comparative)

A steel part made of the carbon-hardening cold-work steel 1.2714 was provided together with a cemented carbide part with a composition of 10 wt % Co, 1 wt % other carbides and the remaining WC.

The braze metal was provided in the form of a foil with a thickness of 100 Linn. The braze material 1 had a composition of 100.0 wt % Cu. The melting temperature is 1085° C.

The foil was placed between the maraging steel part and the cemented carbide part and assembled joining pieces were placed into the furnace where the temperature was first increased to 650° C. at a rate of 20° C./min and hold for 5 minutes. From 650° C. the temperature was then increase by a rate of 10 K/min to the brazing temperature $T_{Brazing}$, which was 1100° C. $T_{Brazing}$ was kept for a dwell time of 15 min. After the dwell time, free cooling was initiated until room temperature.

Subsequently, the cemented carbide-steel joint with the carbon-hardening cold-work steel 1.2714 part was heated to a temperature of 850° C. for 10 min by torch and then quenched to room temperature in oil. After that, tension relaxing was conducted in a vacuum furnace at 200° C. for 2 hours.

Subsequently, the cemented carbide-steel joint with the carbon-hardening cold-work steel 1.2714 part was aged at 500° C. for 2 h.

The sample will herein after be called Comparative 5.

Example 7

The assembled joining pieces were evaluated by measuring the shear strength of the brazed joint, the hardness of the maraging steel part and the TiC layer in the braze joint where applicable.

Figure 6:
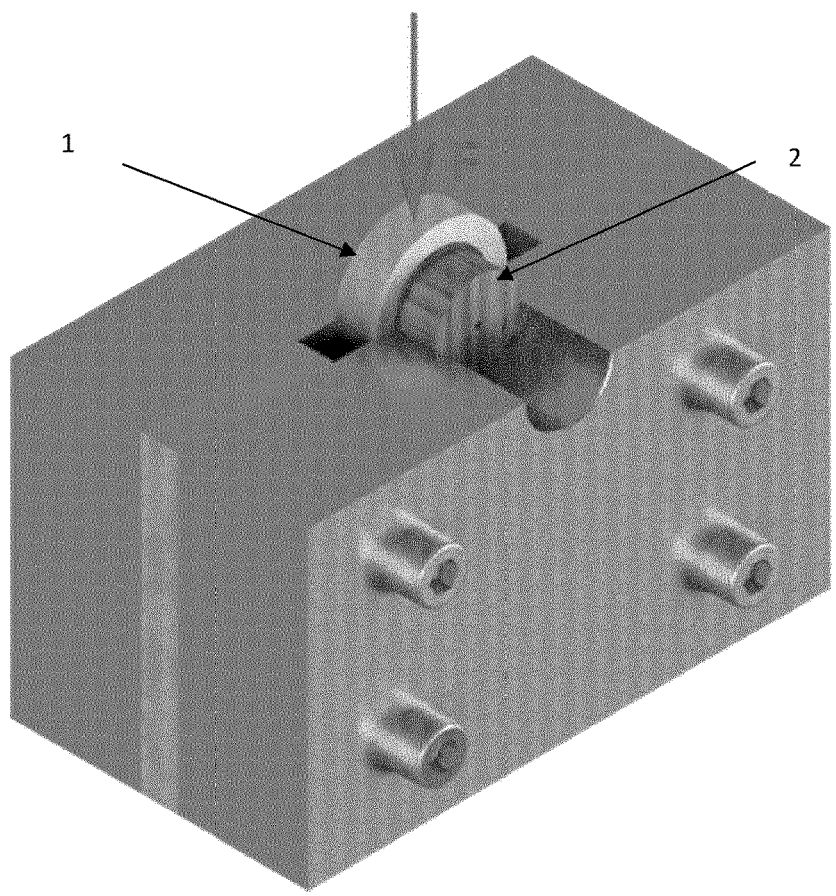
FIG. 6 is a schematic drawing of the shear testing device where 1 is the steel part and 2 is the cemented carbide part.

In order to assess the joint strength properties, the samples were shear tested using a shear device set-up as shown in FIG. 6 where 1 is the steel part in the shape of a steel cylinder (θ=20 mm, h=5 mm) and 2 is the cemented carbide part in the shape of a cemented carbide cylinder (θ=10 mm, h=5 mm. The steel cylinder is positioned in the gap of the shear strength test device and therefore can only be moved in loading direction. A notch, which was eroded into the surface of the device, holds the joined parts in the right position and guarantees an evenly distributed force induction into the braze joint. The applied force was constantly increased until the braze joint failed and the cemented carbide cylinder sheared off. The ultimate shear strength was then calculated by the quotient of the maximal measured force and the initial joining surface (A=78.5 mm²). The braze material was not removed before the determination of brazed joint shear strength. When a rod was tested, the same method was applied.

The hardness of the maraging 1.2709 steel parts was measured by a Vickers hardness tester on a cross section of the maraging steel part, applying a load of 1 kgf (kilogram force) and a loading time of 15 s. A pattern of 3×6 indents covering the complete profile (ca. 20×5 mm²) of the of the maraging steel 1.2709 part in the cross-section was applied.

Figure 4:
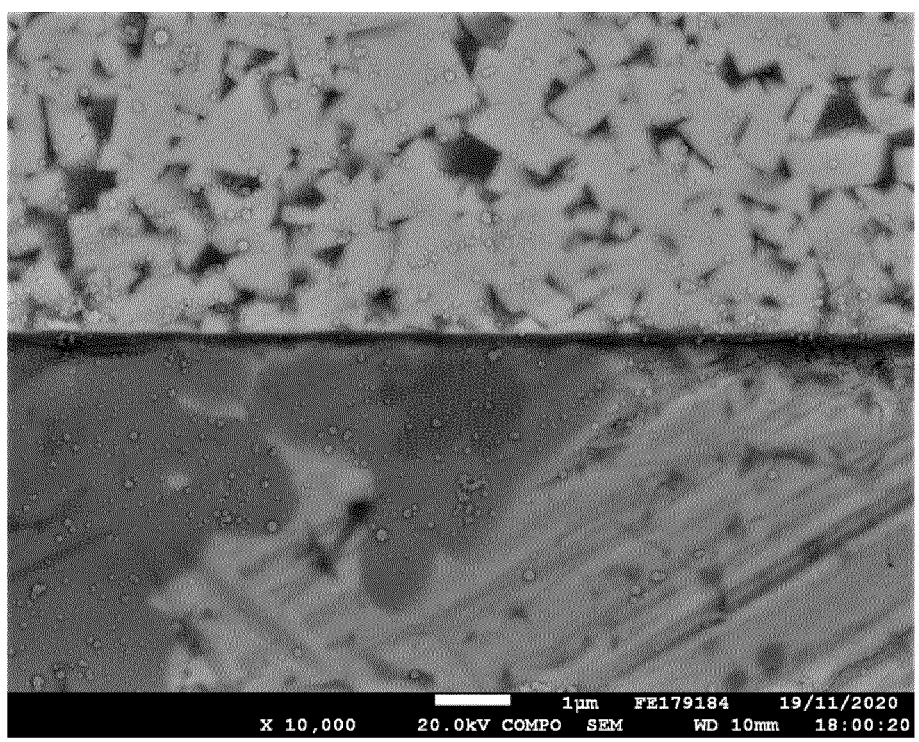
FIG. 4 shows a SEM image of the interface between the cemented carbide part and the braze material of an embodiment of the invention at a magnification of 10000.

To analyze the interface between the braze joint and the cemented carbide on Invention 1-8, SEM-EDS technique was used. The SEM used was a Jeol JSM-7001F, which is a high-resolution Field Emission Scanning Electron Microscopy (FE-SEM) with a thermal Field emission cathode (Schottky). The thickness of the TiC layer in the braze joints of Invention 1-8 was measured on a SEM image at a magnification of 10000. The TiC layer was identified by visual appearance in the back scattered electron mode. In FIG. 4, an SEM image of Invention 2 is shown where the TiC layer is clearly visible. The values of the thickness of the TiC layer given in Table 2 is an average of 3 measurements, all taken in the middle of the braze joint, i.e. far from the edges.

Using EDS, the accumulation of Ti can be identified and measured as a Ti-accumulation layer. By accumulation layer is herein meant the thickness of the accumulation estimated from an EDS scan. The values in Table 2 is an estimation from visual inspection of the EDS scan and is therefore given as an interval.

Figure 2:
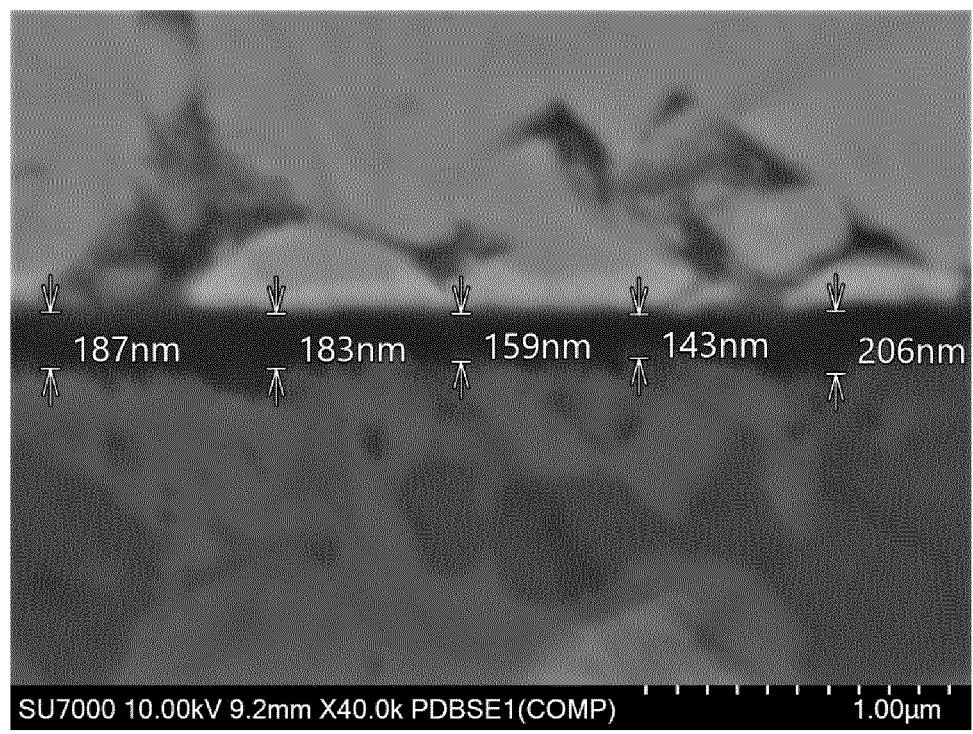
FIG. 2 is a SEM image of the interface between the cemented carbide part and the braze material of invention 9 at a magnification of 40000.

To analyze the interface between the braze joint and the cemented carbide on Invention 9 a different SEM was used, a Field Emission SEM (model SU7000, Hitachi) with Schottky gun. The images were taken with an electron beam of landing energy 10 keV, and signal collected by a photo diode type Backscatter Electron Detector. The TiC layer was identified by visual appearance in the back scattered electron mode. In FIG. 1 a SEM image at 10000 magnification of Invention 9 is shown where the TiC layer is clearly visible. FIG. 2 shows a SEM image at 40000 magnification of Invention 9. The thickness in Table 2 is an average of 5 measurements all taken in the middle of the braze joint, i.e. far from the edges on a SEM image at 10000 magnification.

Figure 3:
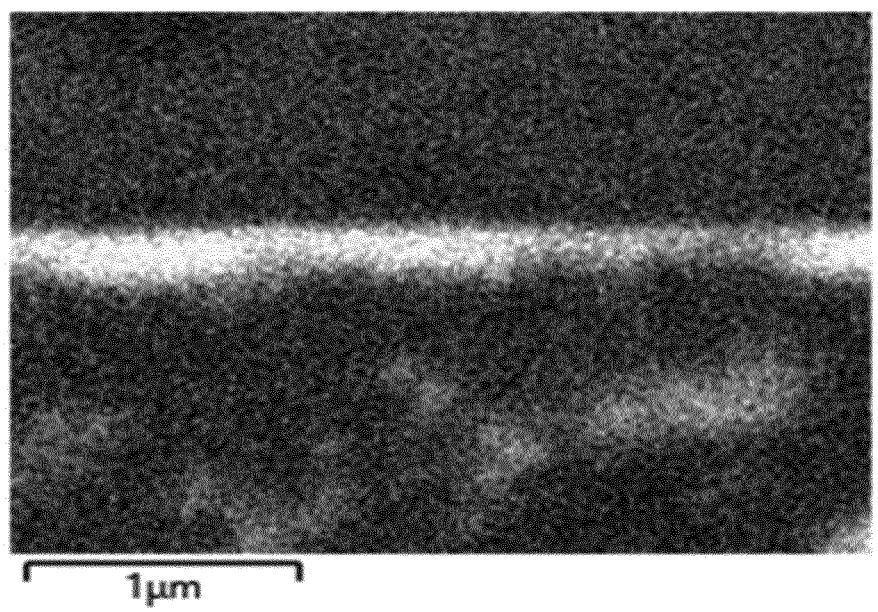
FIG. 3 shows the EDS mapping of the element Ti at the interface between the cemented carbide part and the braze material of an embodiment of the invention.

In FIG. 3, the accumulation of Ti is shown using EDS.

That it actually is a TiC layer was confirmed by analyzing Ti and C using EPMA.

TABLE 2

|  | Shear strength (MPa) | TiC layer (nm) | Ti-accumulation layer (μm) | Hardness (HV1) | Standard deviation |
| --- | --- | --- | --- | --- | --- |
| Invention 1 | 147.1 | 147 | 0.5-1 | 415.3 | 11.5 |
| Invention 2 | 215.3 | 94 | 1-2 | 415.3 | 11.5 |
| Invention 3 | 158.0 | 197 | 0.5-1 | 431.2 | 3.7 |
| Invention 4 | 190.4 | 69 | 0.5-1 | 431.2 | 3.7 |
| Invention 5 | 178.3 | 125 | 1-1.5 | 415.3 | 11.5 |
| Invention 6 | 208.5 | 97 | 1-2 | 415.3 | 11.5 |
| Invention 7 | 197.5 | 109 | 0.5-1 | 415.1 | 24.12 |
| Invention 8 | 170.3 | 141 | 0.5-1 | 415.1 | 24.12 |
| Invention 9 | N/A | 165 | 0.3-0.5 | 455.5 | 4.8 |
| Comparative 1 | N/A | No TiC layer | No Ti acc. layer | 430 | 141 |
| Comparative 2 | N/A | No TiC layer | No Ti acc. layer | 334 | 4 |
| Comparative 3 | N/A | No TiC layer | No Ti acc. layer | 406 | 5 |
| Comparative 4 | 17.1 | 0* | 0 | 494 | 5 |
| Comparative 5 | Joint failure | 0* | 0 | 468 | 18 |

*No Ti in braze material

Example 8

Figure 7:
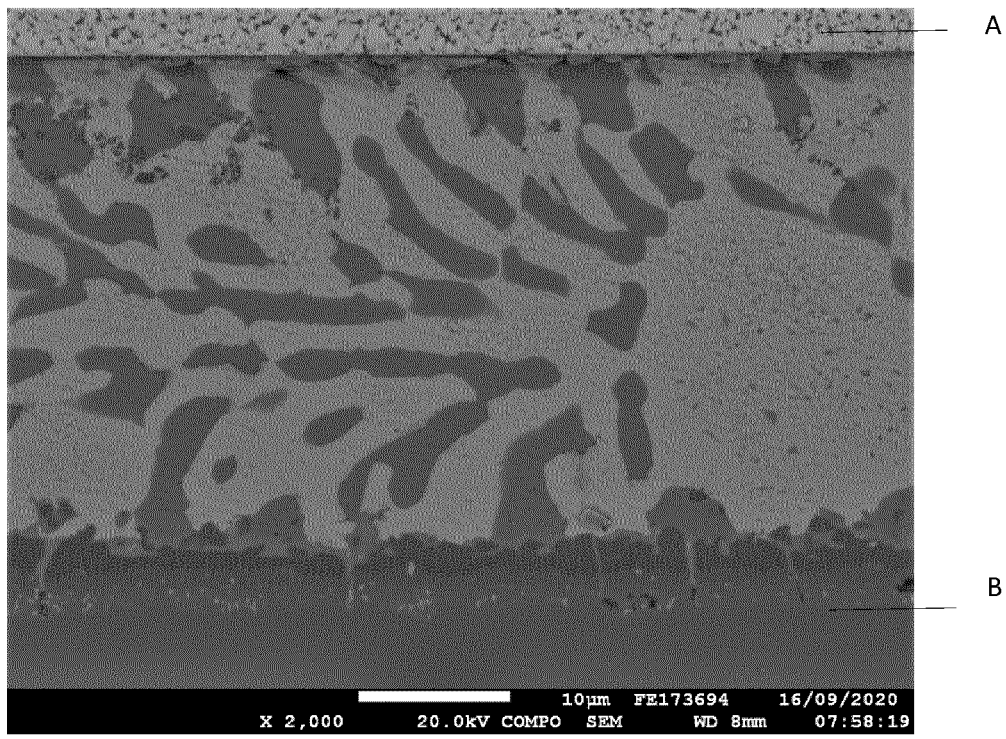
FIG. 7-9 showing different parts of the braze joint from example 7 where A is the cemented carbide part and the B is the maraging steel part.
Figure 8:
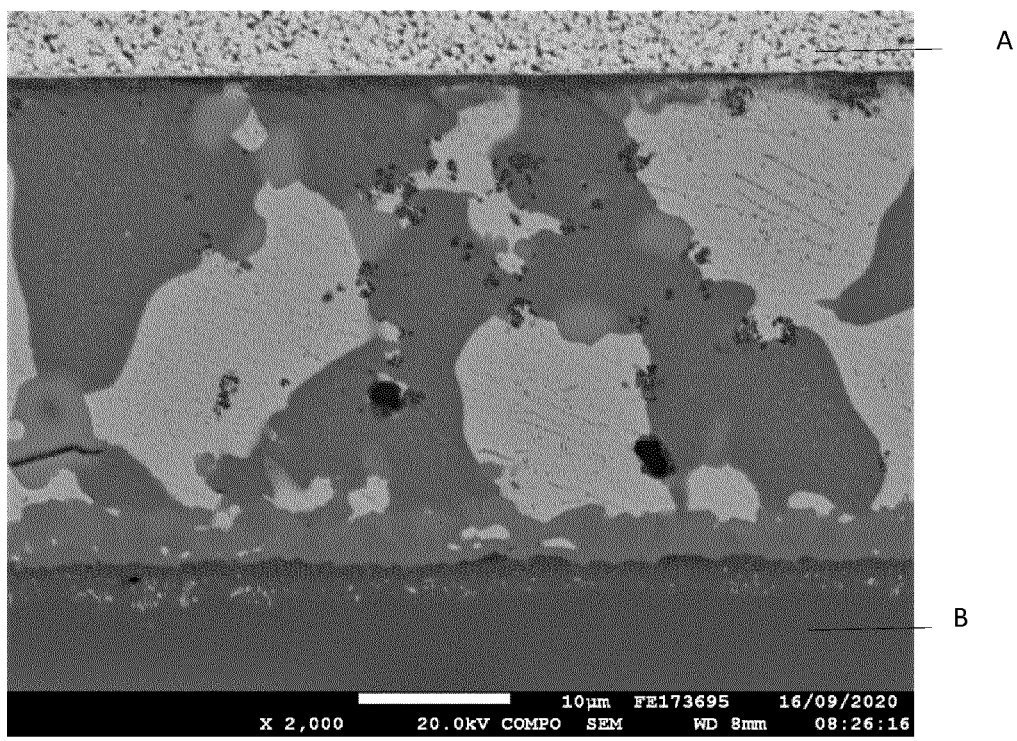
Figure 9:
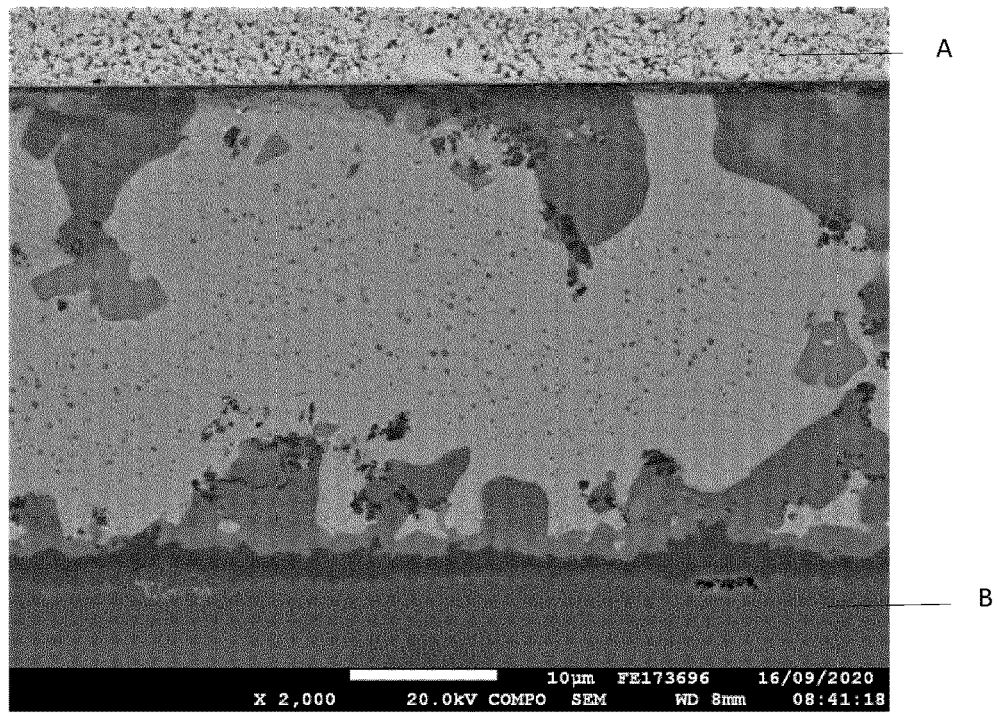
Figure 10:
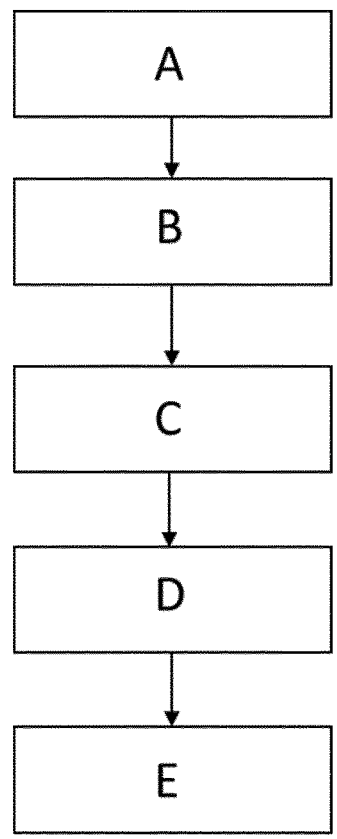
FIG. 10 shows the steps for the claimed method where A is providing a cemented carbide part, B is providing a maraging steel part, C is placing a braze material between the cemented carbide part and the maraging steel part. D is the brazing step and E is the ageing step.
Figure 11:
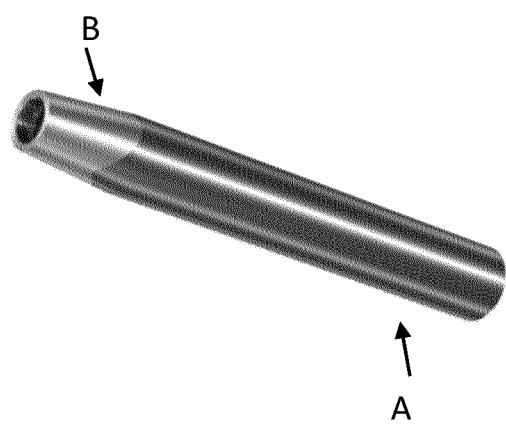
FIG. 11 shows an example of a brazed shank where A is the cemented carbide part and B is the steel part.

The braze joint of invention 2 from Example 1 was analyzed by SEM-EDS and SEM images together with the EDS mapping of three different parts, part 1, 2 and 3 of the braze joint is shown in FIGS. 7-8, respectively. As can be seen, the braze joint is not homogenous.

The different elements in the three different parts of the braze joint was analyzed by measuring the chemical composition of an area by mapping using EDS and the result is shown in Table 3. As can be seen, some contribution from the steel, Fe, Ni and some of the Ti, and from the cemented carbide, W and Co is also included.

TABLE 3

|        | Ti   | Fe   | Co   | Ni   | Cu    | Ag    | Sn   | W    |
|--------|------|------|------|------|-------|-------|------|------|
| Part 1 | 5.35 | 5.78 | 1.18 | 1.39 | 26.93 | 52.94 | —    | 6.33 |
| Part 2 | 6.40 | 6.44 | 1.55 | 1.58 | 32.40 | 33.29 | 9.93 | 8.41 |
| Part 3 | 6.44 | 4.75 | 1.48 | 1.39 | 17.84 | 56.02 | 5.86 | 6.19 |

It is clear from Table 3, that the distribution of the elements in the braze joint varies between different parts of the same braze joint and that more than one part of the braze joint needs to be analyzed in order to obtain a fairly good average composition of the joint.

The invention claimed is:

1. A tool comprising:
a cemented carbide part, wherein the cemented carbide part has a hard phase embedded in a metallic binder phase matrix, wherein at least 50 wt % of the hard phase is WC;
a maraging steel part with a hardness of between 350 and 600 HV1 with a standard deviation between 0 and 20 HV1, wherein the maraging steel part has a hardness of between 400 and 460 HV1 with a standard deviation of between 0 and 14 HV1; and
a braze joint joining said cemented carbide part and said maraging steel part, wherein said braze joint includes Ti, and wherein said braze joint includes a TiC layer with a thickness of between 0.03 and 5 μm adjoining to the cemented carbide part.

2. The tool according to claim 1, wherein the braze joint has a thickness of between 20 and 200 μm.

3. The tool according to claim 1, wherein a shear strength of the braze joint is at least 130 MPa.

4. The tool according to claim 1, wherein the braze joint includes Cu, Ag and Sn.

5. The tool according to claim 1, wherein the braze joint includes Ag in an amount of from 30 to 80 wt %, Cu in an amount of 15 to 65 wt %, Ti in an amount of 0.3 to 15 wt % and Sn in an amount of 0 to 10 wt %.

6. Tool according to claim 1, wherein the maraging steel includes 13 to 25 wt % Ni and one or more alloying elements selected from Co, Mo, Ti, Al and Cr in an amount of 10 to 27 wt %, less than 0.3 wt % C and balance Fe.

7. The tool according to claim 1, wherein the maraging steel includes 13 to 25 wt % Ni, 7 to 15 wt % Co, 3 to 10 wt % Mo, 0.1 to 1.6 wt % Ti, 0.05 to 0.15 wt % Cr, 0 to 0.2 wt % Al, less than 0.3 wt % C and balance Fe and unavoidable impurities.

8. A method of making a tool according to claim 1 comprising the steps of:
providing a cemented carbide part;
providing a maraging steel part, wherein the maraging steel part has a hardness of between 400 and 460 HV1 with a standard deviation of between 0 and 14 HV1;
placing a braze material having Ti in an amount of 0.3 to 15 wt % of the braze material between and in contact with the cemented carbide part and the maraging steel part;
subjecting the cemented carbide part and the maraging steel part with the braze material in between to a brazing step in a furnace at a temperature between 700 and 1200° C., for a time period of between 5 and 60 minutes, and wherein the brazing takes place in vacuum; and
subjecting at least the maraging steel part to an ageing step at a temperature of between 300 and 700° C. for between 5 minutes and 12 hours.

9. The method of making a tool according to claim 8, wherein the brazing step is performed at a temperature between 700 and 950° C., for a time period of between 5 and 15 minutes.

10. The method of making a tool according to claim 8, wherein the ageing step is performed at a temperature of between 55° and 600° C. for between 3 to 6 hours.

11. The method of making a tool according to claim 8, wherein the braze material has a solidus temperature of between 488 and 1123° C. and a liquidus temperature of between 612 and 1180° C., and wherein the braze material, in addition to Ti, further includes one or more elements selected from Ag, Cu, Sn, In, Zr, Hf and Cr.

12. The method of making a tool according to claim 8, wherein the thickness of the braze material prior to brazing is between 25 and 200 μm.

13. The method of making a tool according to claim 8, wherein a clamping force of between 0.5 to 10 MPa is applied during the brazing step.

* * * * *